United States Patent [19]
Schulz

[11] Patent Number: 5,032,294
[45] Date of Patent: Jul. 16, 1991

[54] MULTI-CELL GRAVITY FILTER WITH CENTRAL CONTROL CHAMBER

[76] Inventor: Christopher R. Schulz, 4909 Magdalene Ct., Annandale, Va. 22003

[21] Appl. No.: 492,944

[22] Filed: Mar. 13, 1990

[51] Int. Cl.⁵ .............................................. B01D 24/42
[52] U.S. Cl. .................................... 210/795; 210/264; 210/275; 210/279
[58] Field of Search .............. 210/795, 794, 275, 290, 210/264, 279, 284, 798

[56] References Cited

U.S. PATENT DOCUMENTS

| 3,134,735 | 5/1964 | Greenleaf, Jr. | 210/264 |
| 3,282,432 | 11/1966 | Greenleaf, Jr. | 210/264 |
| 4,322,299 | 3/1982 | Scholten et al. | 210/290 X |
| 4,931,175 | 6/1990 | Krofta | 210/94 X |

OTHER PUBLICATIONS

Brochure DB 310 entitled: "Greenleaf Filter Control", Infilco Degremont Inc., Mar. 1976.
Brochure entitled: "Centrol Multicell Gravity Filters–Potable Water Treatment, Process Water Treatment, Waste Water Treatment", General Filter Company, Ames, Iowa, Undated.

Primary Examiner—Frank Spear
Attorney, Agent, or Firm—Alfred J. Mangels

[57] ABSTRACT

A multiple filter, gravity flow, liquid filtering apparatus includes a plurality of adjacent independent filter chambers with common influent and effluent passages surrounding a centrally located effluent control chamber and having provisions for backwashing at least one filter chamber with the effluent from companion filter chambers. The effluent control chamber preferably has two sections, a lower section which serves to collect filtrate from each of the surrounding filter chambers through a plurality of flow transfer ports which communicate with each filter chamber, and an upper section which houses equipment and controls for filtering and backwash operations. In one embodiment, the lower section includes a vertically disposed outlet conduit with an adjustable weir located at the open end of the conduit. The weir is used to adjust the liquid level in the lower section of the control chamber to control filtering and backwash operations. In a second embodiment, the effluent control chamber includes a specially designed pumped backwashing system in lieu of the adjustable outlet weir. The pump assembly is mounted on the floor of the upper section with associated flow distribution valves and pipes located in the lower section and communicating with the respective flow transfer ports of each filter chamber. The pumped backwashing system is designed to pump flows in the control chamber to individual filter chambers during a backwash event.

11 Claims, 7 Drawing Sheets

MULTI-CELL GRAVITY FILTER WITH CENTRAL CONTROL CHAMBER

BACKGROUND OF THE INVENTION

1. Field of the Invention

This invention relates to improvements in gravity filters which employ multiple filter cells having monomedia or dual-media filter beds which are adapted to be individually backwashed by effluent from companion filter cells. In particular, the invention comprises a novel, centrally-located, filtered water effluent control chamber which communicates with each filter cell and contains an adjustable circular weir or, alternatively, a pumped backwashing system, which is used to control the backwashing process.

2. Description of the Related Art

It is known in the prior art that a plurality of filters can be connected in parallel with common influent and effluent passages and with provisions for backwashing one or more filters with the effluent of companion filters, while the other units continue their normal filtering operations. Examples of these type of filters (referred to hereinafter as self-backwashing filters) will be found in U.S. Pat. Nos. 3,134,735 and 3,282,432, both issued to Greenleaf. Self-backwashing filters normally require substantially deeper filter boxes than conventional filters that use backwash pumps in order to provide sufficient head for fluidized-bed backwashing. The need for deep filter boxes (typically greater than 20 feet) has precluded the use of such filters in package water treatment systems, which are limited to a maximum tank depth of 12 feet to comply with shipping requirements.

It is also known that it is difficult to adjust the rate of backwashing in self-backwashing filters to compensate for changes in the temperature of the backwash water, provide higher backwash rates if the filter beds are difficult to clean or lower rates to prevent loss of filter media. The backwash rate is normally adjusted by changing the height of a common filtered water effluent weir by adding or removing stop logs. This is a tedious procedure and seldom done in practice. It also does not allow backwash rates to be adjusted during a backwash cycle to optimize the backwash process.

It is further known that a system of interconnecting filter underdrains is required for backwashing one or more filters with the effluent of other filters and that for this reason individual filter cells cannot be isolated and removed from service for inspection or repairs unless large isolation valves are installed between adjacent filter underdrains. Such valves are also generally required when air scour systems are used for cleaning filter beds in order to prevent backwash water from entering the filter cell while the bed is being air scoured. Isolation valves must be large enough to minimize pressure drops across valve openings during backwashing. They also add considerably to the operational complexity and cost of the filter system.

Thus, although self-backwashing filters are simple and effective filtering devices which do not require as much mechanical equipment (e.g., pumps, motors, rate-of-flow controllers) as conventional gravity filters, they are characterized by several shortcomings including the need for deep filter boxes, a relatively inflexible method for adjusting backwash rates, and the need for additional valves for isolating filter cells during repairs or when air scour systems are used. For these reasons, they seldom have been used in package water treatment plants or where site constraints preclude the use of deep filter boxes.

SUMMARY OF THE INVENTION

With the foregoing considerations in mind, the present invention provides an improved self-backwashing gravity filter which includes a plurality of individual filter cells and a unique two-tiered centrally-located filtered water effluent control chamber. The novel design of the control chamber provides a very compact filtration system with greater flexibility in controlling air scour and backwash operations and the means for isolating individual filter cells without using large and expensive valves.

In the preferred embodiment, the lower tier of the control chamber is in free bi-directional communication with each filter unit by means of individual ports and contains a vertically disposed outlet pipe with an adjustable circular overflow weir which is used for collecting filtrate as well as for controlling the liquid level in the control chamber and available head for filtering and backwashing. The upper tier of the control chamber houses an air blower and associated air distribution piping which directs compressed air to each filter cell for air scouring purposes. The upper tier is surrounded by water on all sides and recessed within the filter structure, thereby attenuating any noise emitted by the air blower equipment.

In an alternative embodiment, a small backwash pump is installed in the upper tier and is used to recycle filtrate from the lower tier of the control chamber to individual filter units for backwashing purposes. A fixed vertically disposed outlet pipe is used to maintain a constant liquid level in the control chamber or, alternatively, this liquid level can be maintained downstream of the filter apparatus by an overflow weir in the filtered water clearwell, which communicates with the control chamber by means of a pipe interconnection.

Another unique aspect of the instant invention are the flow transfer ports which penetrate through the lower floor of the control chamber and which communicate with individual filter cell underdrains. These ports allow filtered water to flow freely in either direction during filtering and backwashing cycles. Additionally, any given filter cell can be removed from service for repairs or inspection by simply sealing the appropriate port with a rubber plug, thereby isolating that filter cell while allowing other filter cells to continue to operate.

In the preferred method of backwash operation, air scour is used for primary cleaning of the filter media and backwashing to subsequently conveying dislodged impurities to a waste drain. Under these conditions, sub-fluidization backwash rates may be used, which are approximately one-half of the rates required for conventional fluidized-bed backwashing. Since lower backwash rates are used, the required head or water depth for backwashing in the operating filter cells is less so shallower filter boxes can be used. This reduces the construction cost of the filter box and makes it possible to use self-backwashing filters in a package water treatment system.

For dual- or multi-media filter beds which include two or more media layers with different relative densities, fluidized backwashing is generally required to retain the segregation between layers following backwashing. To achieve fluidized backwash rates in self-backwashing filters the elevation of the filter effluent weir must be considerably higher (around 3 feet) than the top of the filter washwater troughs, resulting in deeper filter boxes. To avoid using deep filter boxes, that additional head can be provided instead by a pump located in the upper tier of the central control chamber of the present invention. The pump and associated piping are designed to recycle filtrate from the bottom tier of the chamber into the effluent port of any filter cell for backwashing purposes. Because of the low backwash head losses associated with a self-backwashing filtration system, the size of the pump is much smaller than for conventional filtration systems.

Another unique aspect of the instant invention is the elimination of filter washwater gullets. Instead, specially designed washwater troughs with a circular cross-section span the filter cells above the filter media and are connected directly to vertical drain pipes on the outside of each filter unit. During a backwash event, washwater uniformally overflows into the troughs and is conveyed through the exterior drain pipes to a remote sump or drain. By eliminating washwater gullets, the available area for filtering is increased, an important advantage for package water treatment systems where space is limited.

Based on the foregoing discussion, the present invention readily lends itself to a variety of water and wastewater treatment applications and in particular to package water treatment systems due to its compact layout, relatively shallow filter boxes, and simplicity and flexibility of operation.

Accordingly one of the objects of the present invention is to provide an improved self-backwashing filtration system that is simple to operate, compact and makes use of relatively shallow filter boxes so that the entire system can be incorporated into a standard-size package water treatment system.

Another object of the present invention is to provide an improved self-backwashing filtration system including a central filter effluent control chamber which communicates with individual filter cells and contains an adjustable overflow weir for controlling the available head for filtering and backwashing.

A further object of the present invention is to provide an improved self-backwashing filtration system including an air scour and backwash system for cleaning the filter beds and the capability to use either sequential or concurrent air-water backwashing without the need for special filter underdrain isolation valves.

A further object of the present invention is to provide an improved self-backwashing filtration system with means for isolating individual filter cells without interfering with the operation of companion filter cells or requiring the use of large and expensive isolation valves.

A further object of the present invention is to provide a filtration system that includes a central compartment reserved exclusively for housing the mechanical equipment used in performing filtering and backwashing operations and which is recessed within the filter structure for noise abatement.

A further object of the present invention is to provide a filtration system that eliminates filter washwater gullets, thereby providing more space for the filter beds and increasing the capacity of the filtration system for a given tankage volume.

With these and other objects in view which will more readily appear from the detailed description hereinafter provided, the invention includes the novel combination and assembly of parts hereinafter more fully described, illustrated and claimed, with reference being made to the attached drawings.

DESCRIPTION OF THE PREFERRED EMBODIMENTS

Figure 1:
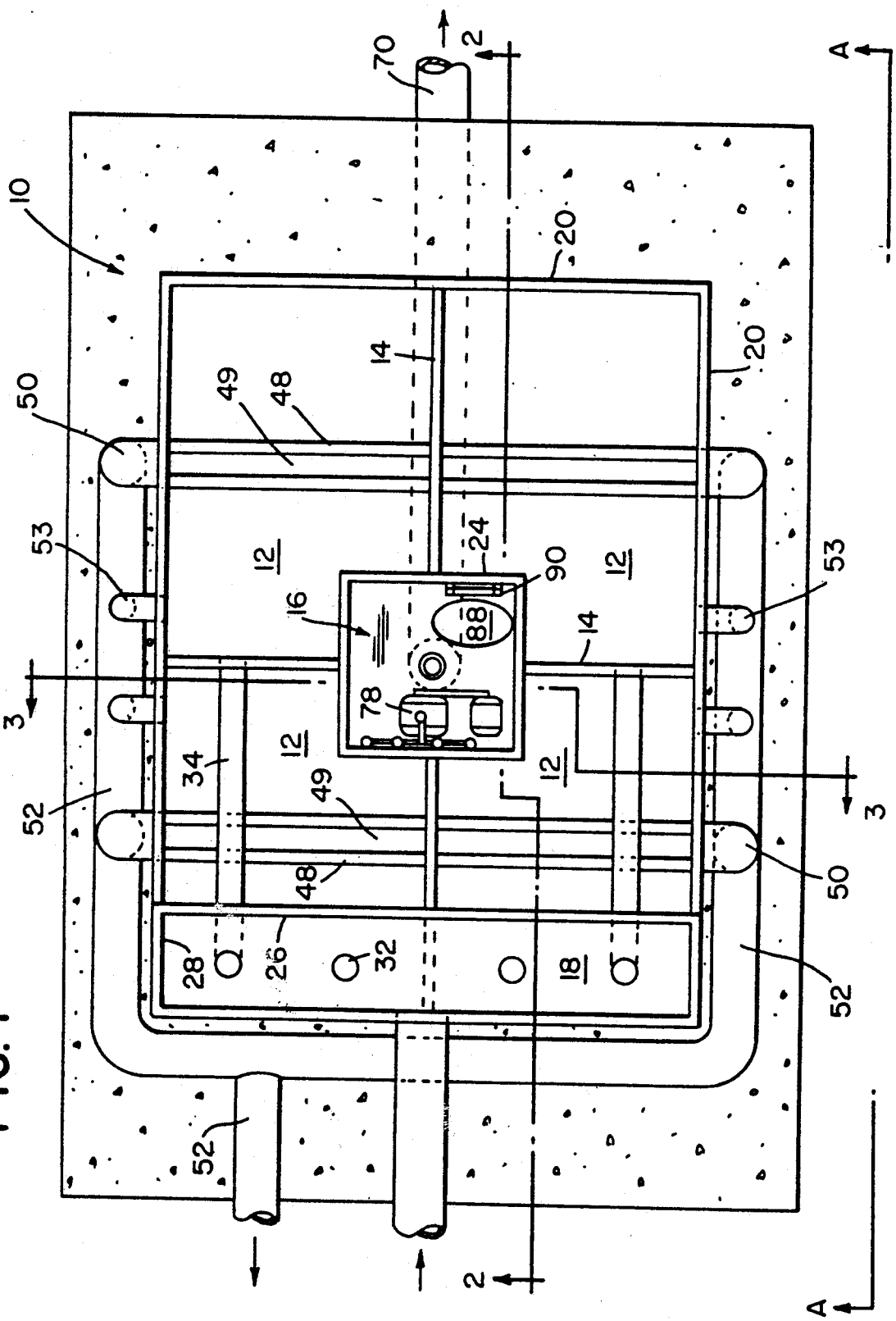
FIG. 1 is a top plan view of a self-backwashing filter system in accordance with the present invention.
Figure 2:
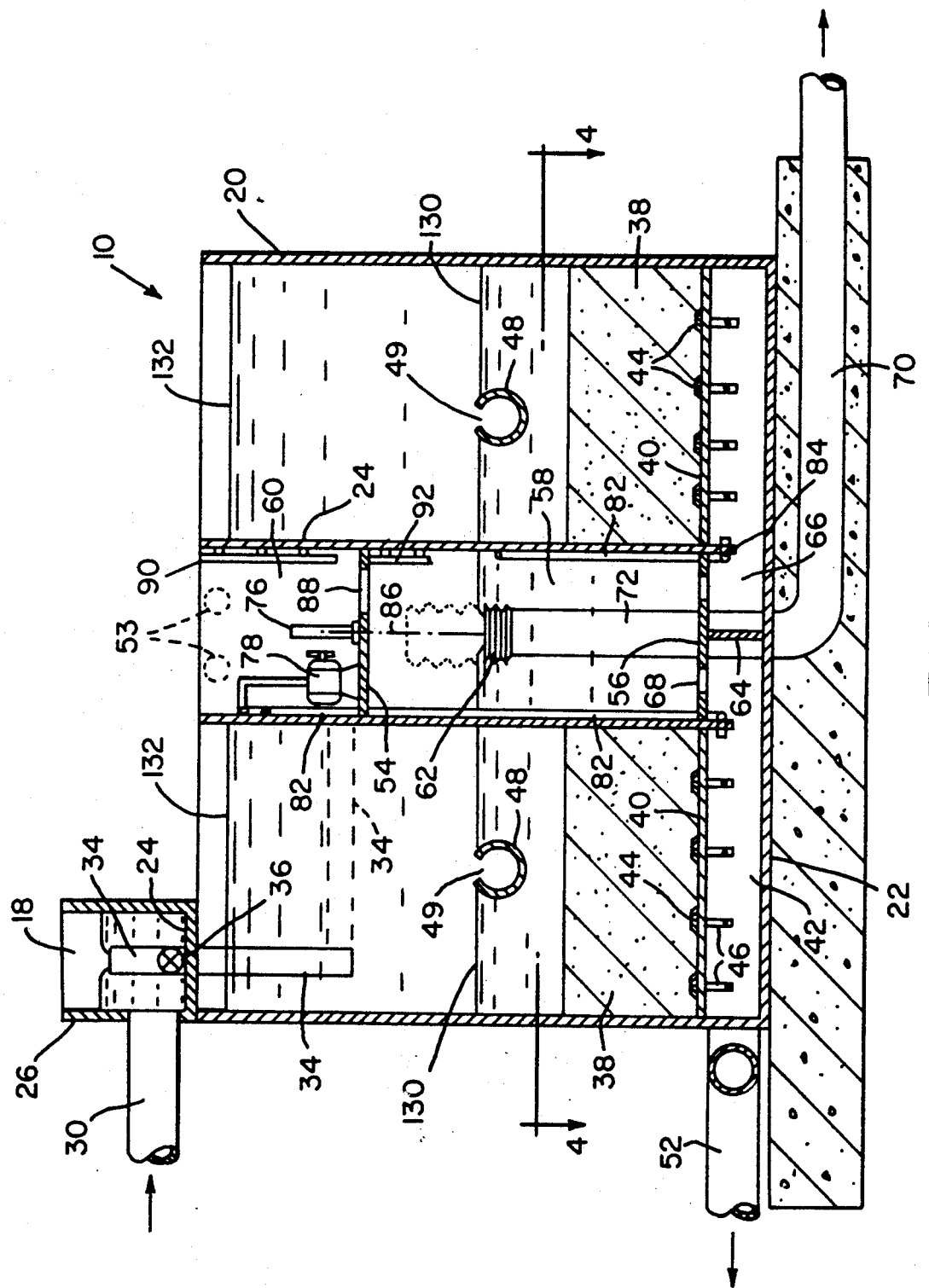
FIG. 2 is a vertical sectional view taken along the line 2—2 in FIG. 1.

Referring now in detail to the accompanying drawings, FIGS. 1 thru 5 show a generally rectangular gravity filter apparatus 10, in accordance with the present invention. The apparatus includes four filter cells 12, each adjacent pair of cells sharing common interior sidewalls 14. Cells 12 surround a central filtered water effluent control chamber 16. Influent trough 18 (see FIG. 2) rests on top of one end of the main filter structure. The filter cells 12 are contained within rectangularly positioned exterior sidewalls 20 of apparatus 10, and are individually subdivided by interior partitioning walls 14 which rise vertically from impervious filter bottom 22. The partitioning walls 14 extend inwardly from exterior sidewalls 20 to abut sidewalls 24 of chamber 16, forming four independent filter cells. In addition to the generally rectangular cells 12 and chamber 16 depicted in the drawings, it will be evident that a circular control chamber surrounded by wedged-shaped filter cells can also be provided, as well as other configurations, within the scope of the present invention.

Water or sewage influent is distributed in equal portions to each filter cell 12 by means of influent trough 18. Trough 18, which can be of rectangular conformation as shown, includes bottom floor 24, opposed, spaced sidewalls 26 and opposed, spaced endwalls 28. At least one inlet pipe 30 penetrates through openings in the outermost sidewall 26 to discharge into the tray on 18 incoming liquid to be filtered. A series of four vertically disposed, substantially equal area circular influent weirs 32, which are uniformaly spaced along trough 18, equally divide the influent and distribute it to the several filter cells 12. The weir elevations are preferably maintained above the top of inlet pipe 30 so that the incoming flow is submerged to minimize turbulence within trough 18. Circular weirs 32 extend through floor 24 and communicate by vertical and horizontal piping 34 with a respective filter cell 12. Inlet valves 36 are provided in piping 34 for controlling the influent flow rate to each filter cell.

Each filter cell 12 includes a horizontal filter bed 38 which preferably includes a mono-media bed of sand or coal, supported on an intermediate floor 40 which is spaced above filter bottom 22. By virtue of the spacing of intermediate floor 40 above the filter bottom 22, each filter cell 12 is provided beneath its respective filter bed 38 with an underdrain plenum 42 to receive the filtered liquid which has percolated downwardly through the filter bed 38 from above. A plurality of uniformally spaced slotted nozzles 44 (See FIG. 4) extend through intermediate floor 40 and into the underlying plenum 42. The tops of the nozzles 44 each have a plurality of narrow slots to provide a sufficient open area for filtered water or backwash water to flow through the nozzles with a minimal pressure drop while preventing filter bed material from passing therethrough and entering into plenum 42. Slotted nozzles 44 also include tailpipes 46 of standard design which allow use of combined air-water backwashing for cleaning filter bed 38, as will be discussed hereinafter in more detail. It will be appreciated that a variety of low head loss filter underdrain systems are available and could be used in place of the standard slotted nozzle system shown in the accompanying drawings.

Figure 5:
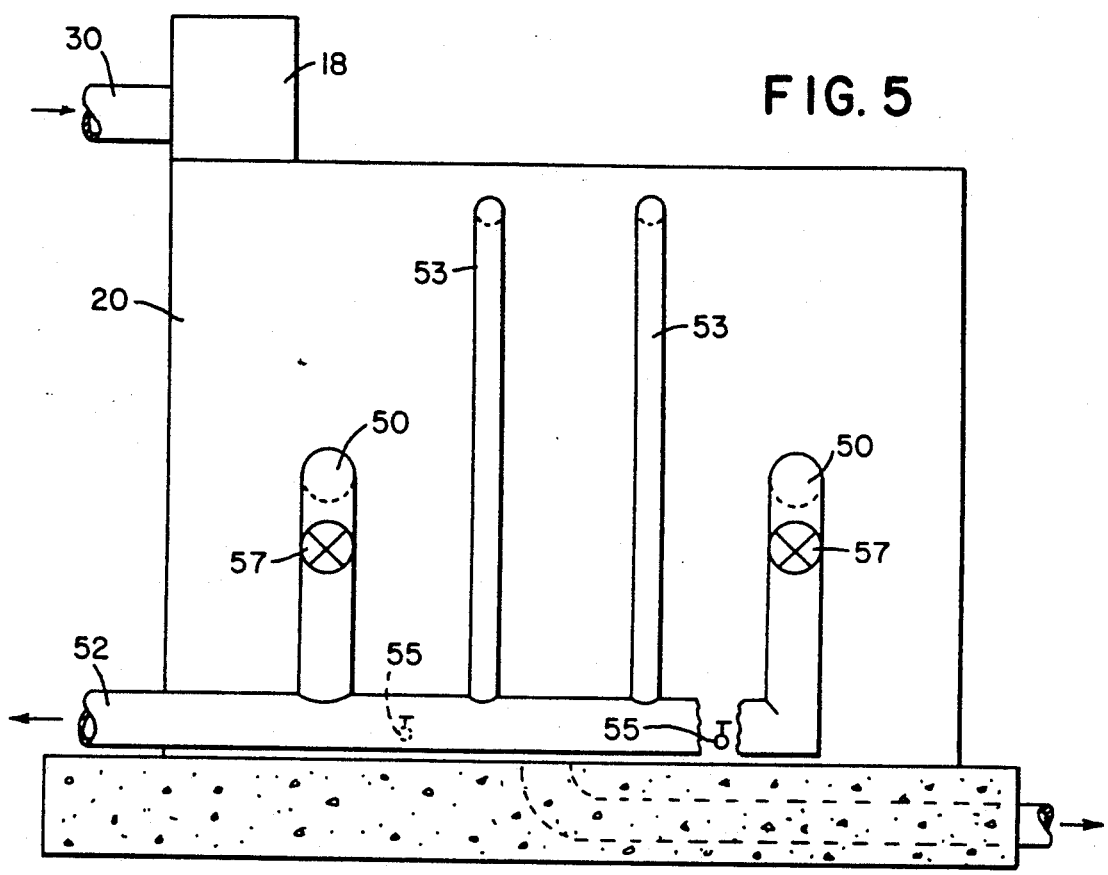
FIG. 5 is a side elevational view illustrating the exterior overflow and vertical drain pipes of the filter system.

Each filter cell 12 also includes one or more backwash troughs 48. As is well known, these troughs will serve to skim off and carry away impurities which are conveyed to the upper surface of the water in a filter cell during the backwashing operation. In a novel arrangement, the troughs 48 have a circular cross-section with a longitudinal slot 49 along the top and having sufficient open area to permit a predetermined flow of backwash water to freely discharge into the trough and be carried away by the force of gravity to a waste drain or sump. The narrow slot configuration and circular cross-section of trough 48 also effectively prevent filter media from being thrown into the trough during air scouring, which sometimes occurs when conventional U-shaped troughs are used. As is best seen in FIGS. 1 and 5, the backwash troughs 48 communicate with vertical drain pipes 50 mounted on the exterior of each filter cell 12 and include isolation valves 57. Drain pipes 50 are each connected to a horizontal drain manifold 52 which runs along each side of gravity filter 10. Thus it will be seen that backwash water can be quickly evacuated from the filter cells 12 by means of this novel piping arrangement, which obviates the need for standard washwater gullets that are typically installed adjacent to each filter cell to provide a temporary storage volume for washwater flows.

An overflow drain pipe 53 is provided near the top of each filter cell 12 to divert filter cell overflows to horizontal drain manifold 52 in the event that the water level in cell 12 is allowed to rise to the top of the filter cell.

The novel filtered water effluent control chamber 16 is positioned in the center of the gravity filter apparatus 10. It is completely enclosed by sidewalls 24 and is divided into two vertically spaced sections separated by intermediate floor 54. The lower section 58 is a weir-containing chamber wherein filtered water is collected from each of the underdrain plenums 42 and directed by gravity into the chamber in an upward direction to circular overflow weir 62. The height of which is vertically adjustable, and which is used to maintain the water supply in lower section 58 at a predetermined level to control filtering and backwash operations. The upper section 60 is a watertight compartment and houses an air blower 78, pneumatic controls 76, air piping 82 and other equipment for filtering and backwashing operations. The specific features of the two-tiered control chamber are discussed in more detail in the following paragraphs.

Figure 4:
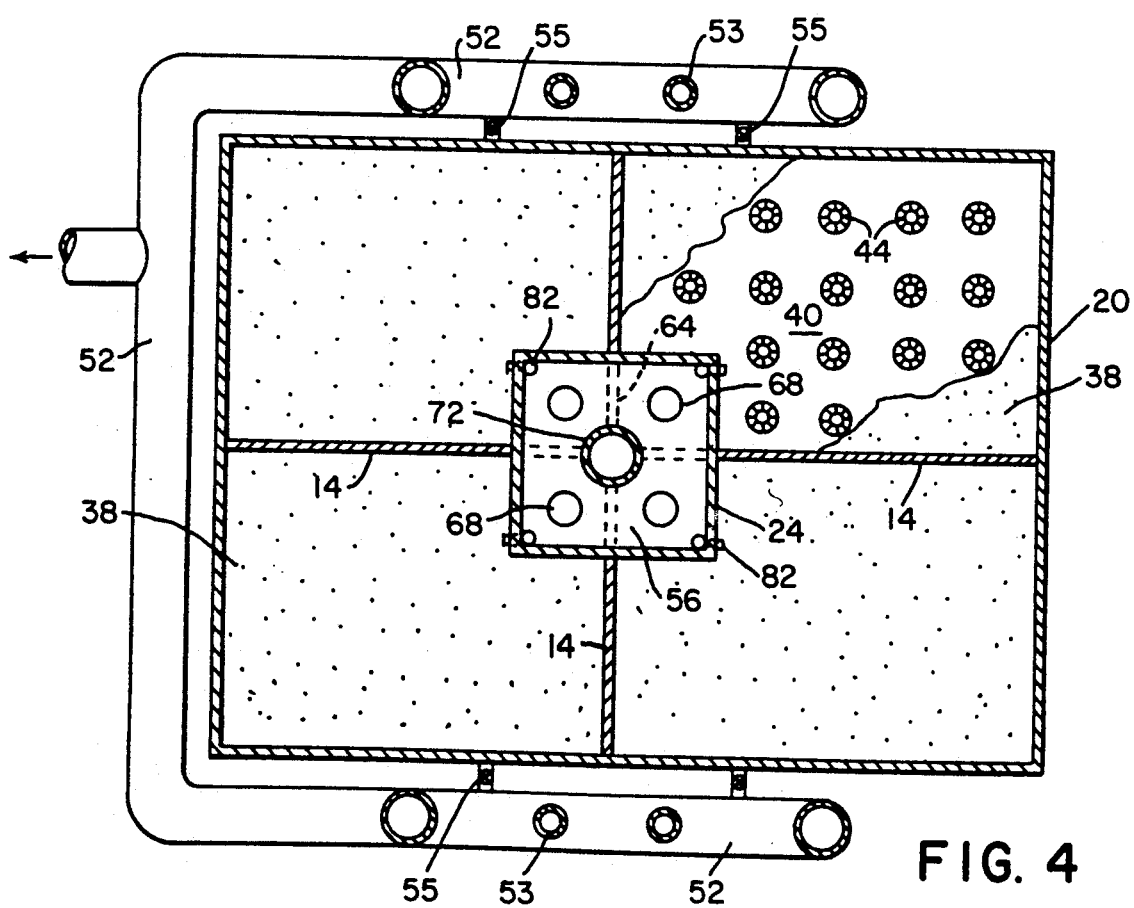
FIG. 4 is a horizontal sectional view of the bottom portion of the filter system shown in FIG. 2 taken along the line 4—4 of FIG. 2.

Lower section 58 of the control chamber 16 includes an intermediate floor 56 that is vertically spaced above filter bottom 22, is fixedly connected along its perimeter to chamber sidewalls 24, and is supported from below by webs 64. By virtue of the spacing of floor 56 above filter bottom 22, a central plenum 66 is defined which communicates with each of the filter underdrain plenums 42. Control chamber sidewalls 24 extend downwardly a short distance below floor 56, forming a continuous lip 84 around central plenum 66, which lip acts as a barrier to prevent air bubbles from escaping into the control chamber when a filter cell is air scoured. In addition to providing structural support, webs 64 also form a watertight barrier between adjacent filter underdrain plenums 42 so that each filter cell is completely isolated from the others. The sole means of communication between filter cells 12 and lower section 58 of the control chamber 16 is therefore through flow transfer ports 68 in floor 56. As is best seen in FIG. 4, a total of four transfer ports 68 are provided in floor 56, or one port per filter cell 12. Ports 68 have a preferably circular configuration and can be plugged if it is desired to isolate an individual filter cell. Ports 68 are large enough so that the pressure drop across the ports during backwashing is negligible, and they conveniently allow filtered effluent to flow freely back and forth between the control chamber 16 and individual filter cells 12 depending on the relative water levels in each.

Filter outlet pipe 70 is the sole conduit for directing filtrate out of the filter apparatus. One end of outlet pipe 70 is connected with a vertical riser 72 in the center of lower section 58 of the control chamber which terminates at circular overflow wier 62. The other end extends horizontally below the bottom of the filter apparatus 10 and is finally directed into a suitable storage tank, reservoir or the like (not shown). To avoid the need for an opening in filter bottom 22, an alternative piping configuration, which is not depicted in the accompanying drawings, could include two smaller-diameter pipes, with a combined flow carrying capacity equal to or greater than vertical riser 72, branching off the vertical riser between filter bottom 22 and intermediate floor 56, extending through two adjacent filter underdrain plenums, penetrating through watertight openings in exterior sidewall 20, and combining into a single pipe again on the outside of the filter structure.

Figure 6:
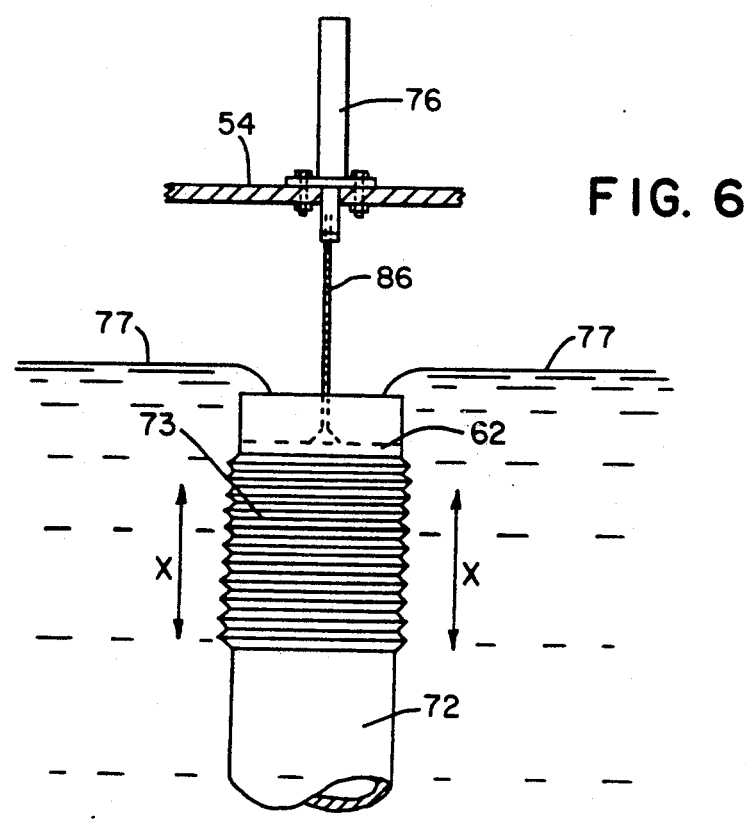
FIG. 6 is an enlarged fragmentary view illustrating a membrane-type adjustable circular overflow weir of the filter system.

The height of vertical riser 72 establishes the minimum water depth in chamber 58 and is preferably maintained above the level of the upper surface of filter media bed 38 so that bed 38 remains under positive pressure and air is not drawn into the filter. As shown in more detail in FIG. 6, adjustable control overflow weir 62 at the top of vertical riser 72 is preferably made of a flexible, accordion-type sleeve 73 that can be extended upwardly or retracted downwardly by pneumatic actuator 76 or other suitable means. Such weir height adjustments are used to control the water level 77 in the control chamber 16, which determines the available head for filtering and backwashing. If an extended range of vertical travel X is required, a slip tube of any standard design may be used as an overflow weir, instead of the accordion type sleeve shown in FIG. 10.

Figure 3:
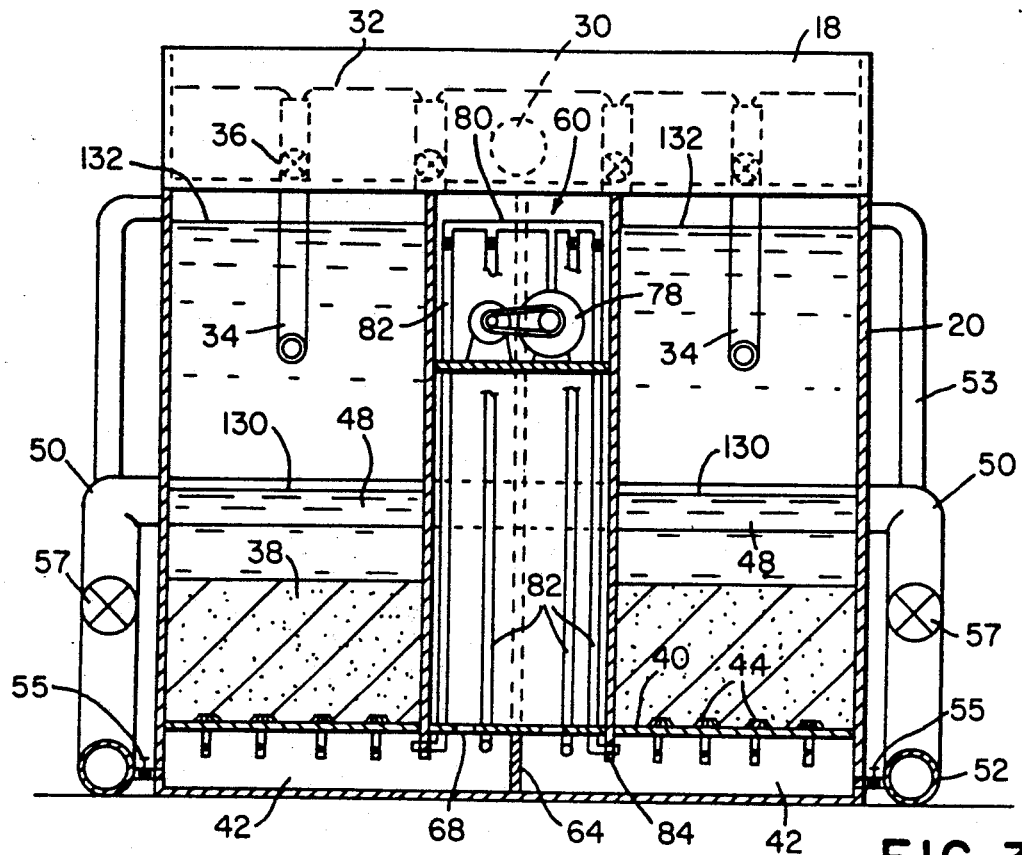
FIG. 3 is a vertical sectional view taken along the line 3—3 in FIG. 1.

Upper section 60 of control chamber 16 includes air blower 78 and pneumatic actuator 76, both of which are mounted on intermediate floor 54. As is best seen in FIG. 3, air blower 78 discharges compressed air into air piping manifold 80 mounted on one of the chamber walls. Lateral air pipes 82 extend downwardly from manifold 80 through intermediate floors 54 and 56, finally penetrating through openings 84 near the bottom of sidewalls 24 and into each of the four filter underdrain plenums 42. Since air blower 78 is located above the high water level in control chamber 16, water cannot back up through lateral air pipes 82 and damage mechanical equipment. Pneumatic actuator 76 is preferably located directly above control weir 62 and is connected with it by means of shaft 86, the actuator providing automatic, controllable means for adjusting the height of weir 62 during backwashing operations. Access to the upper and lower tiers of control chamber 16 is provided by manhole 88, which is located in an open corner of floor 54, and by ladders 90, 92.

OPERATION

In the operation of the present invention, normally all of the filter cells will be in continuous filter operation jointly receiving influent in equal quantities from trough 18 and discharging filtrate into the lower tier 58 of control chamber 16, from which it is ultimately delivered into a filtered water storage tank or reservoir. Normally the filtering action will occur when the depth of influent above the filter bed 38 in a given cell 12 is between the minimum and maximum operating levels as indicated by the liquid level lines 130 and 132 in FIG. 2. Low liquid level 130 is established at the same elevation as the top of overflow weir 62 so that when the level of influent drops to this level 130, no flow of liquid through filter bed 38 will occur due to equalized pressures in the filter cell 12 and central control chamber 16. Upper liquid level 132 is established just below overflow outlet 53 (see FIG. 3) although a lower upper liquid level is required for sequential air/water backwashing, as discussed hereinafter.

Figure 10A:
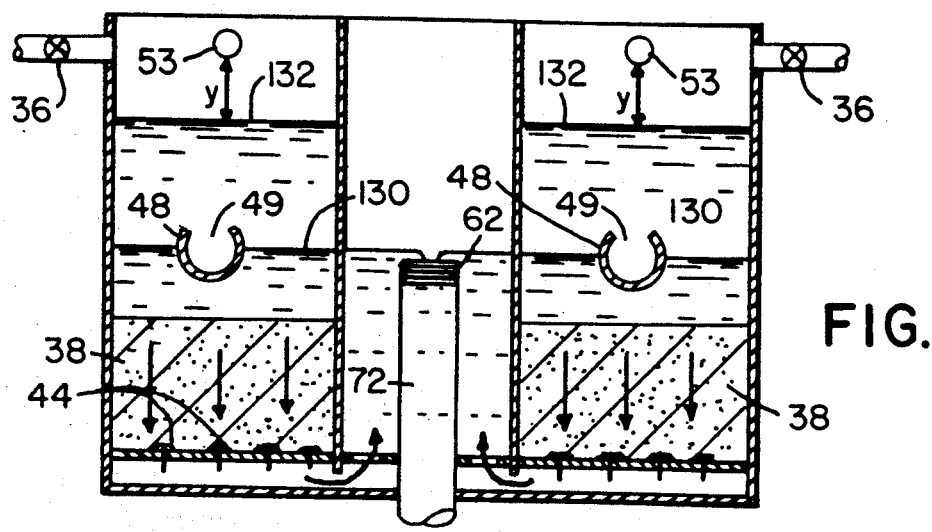
FIGS. 10A thru 10C are diagrammatic views showing how backwash operations are controlled by the adjustable circular overflow weir.
Figure 10B:
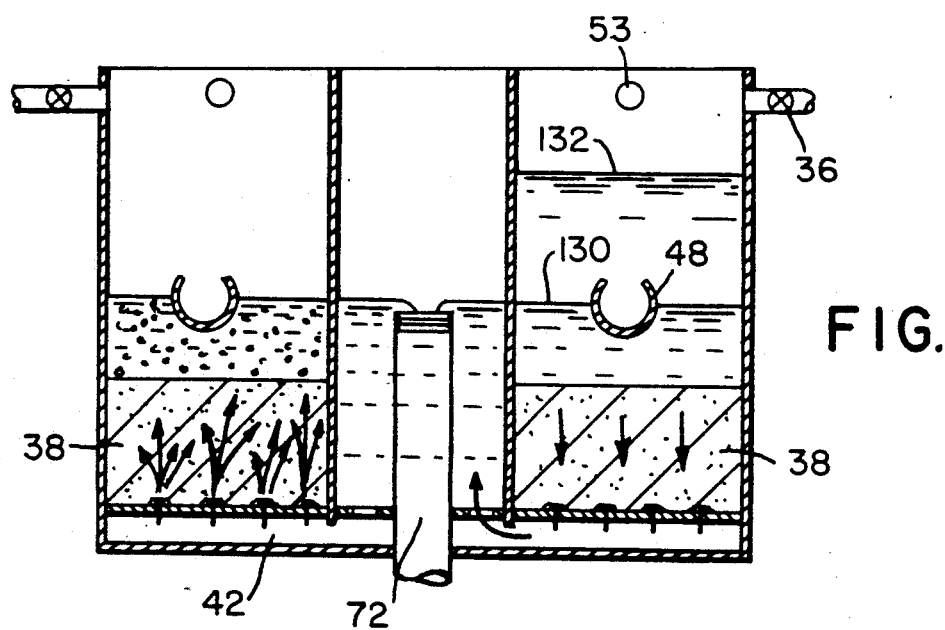
Figure 10C:
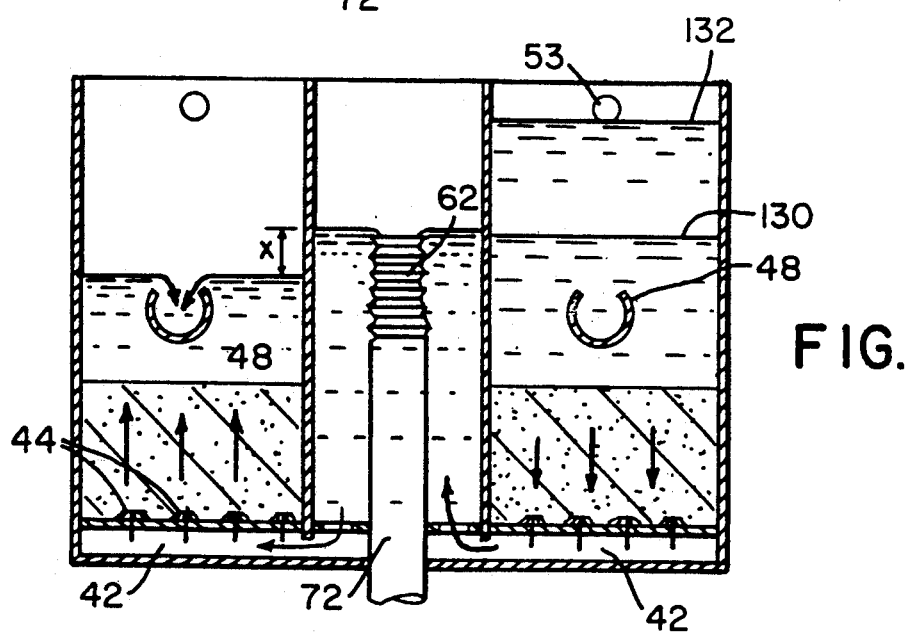

For sequential air/water backwashing, an adjustable overflow weir 62 is used and maintained at the lower (contracted) position at the start of the backwash cycle, as illustrated in FIGS. 10A and 10B. Inlet valve 36 is closed and drain valve 57 (see FIG. 5) is opened, thus allowing the liquid level in the filter cells to drop to the minimum operating level 130, which is preferably slightly below the slot opening of backwash trough 48. Compressed air is then discharged into underdrain plenum 42, forming an air blanket underneath intermediate floor 40, which air is continuously metered into filter bed 30 through filter underdrain nozzles 46. The compressed air provides violent agitation and scouring of the filter media without expanding the bed, as illustrated conceptually in FIG. 10B. After a short duration, typically 2-5 minutes, the air flow is stopped and overflow weir 62 is moved to the upper (extended) position, a short distance above the top of the washwater trough, as shown in FIG. 10C. The resulting difference in liquid levels between the control chamber and the drained filter, typically about 1.0 feet, is sufficient to provide adequate backwashing of the filter at non-fluidized rates. When overflow weir 62 is moved to the upper position, the liquid levels in the three operating filters will correspondingly rise by a distance Y (see FIG. 10A) equal to the length of vertical travel of the adjustable weir. Therefore, the maximum operating liquid level 132, should be maintained at a distance Y below overflow outlet 53, so that influent in the operating filters will not drain into outlet 53 when the liquid level rises during backwash operations. After backwashing is completed, overflow weir 62 is lowered to its original position, drain valve 57 is closed and inlet valve 36 is opened. The filter cells then resume normal filtering operations.

For concurrent air/water backwashing, the above sequence of operations is followed except that overflow weir 62 remains stationary at a fixed distance above the filter washwater trough and the air scour is applied concurrently with non-fluidized backwashing. Furthermore, since the height of the weir does not need to be adjusted during the backwash cycle, the maximum operating liquid level 132 in the filter cells can be established just below oveflow outlet 53.

If fluidized-bed backwashing is desired, the distance X (see FIG. 9C) between liquid levels in the control chamber and the drained filter must be increased substantially (at least 3 feet) to provide sufficient backwash pressure. This will necessarily deepen the filter box because water levels in the operating filter cells must be established above the higher overflow weir. The elevation of the washwater troughs must also be higher to provide room for the filter media to expand underneath the troughs. The backwash sequence for such a configuration would be the same as for concurrent air-water backwashing except that the air scour step could be eliminated if higher backwash rates alone are effective in dislodging impurities in the filter bed. Two-stage backwashing, in which a low backwash flowrate is followed by a high flowrate, can be accomplished by means of a slip-tube of standard design (not shown). The slip-tube would be vertically adjustable to allow liquid levels in the control chamber, and hence backwash rates, to be adjustable over a fixed range.

The present invention also provides a simple means for completely draining an individual filter cell for repairs or inspection. This is accomplished by first inserting a sealable plug in flow transfer port 68 to isolate a given filter cell 12 and then draining the cell by opening valve 55 (see FIGS. 3 and 4), which communicates with horizontal drain manifold 52. The plug may be suspended from a chain or cable fixedly attached to the underside of intermediate floor 54 and of suitable length and alignment so that the plug can be dropped into the lower tiers of control chamber 16 and mate with the appropriate flow transfer port 68. This procedure can be done without materially interfering with the operation of companion filter cells.

DESCRIPTION OF THE ALTERNATIVE EMBODIMENT

Figure 7:
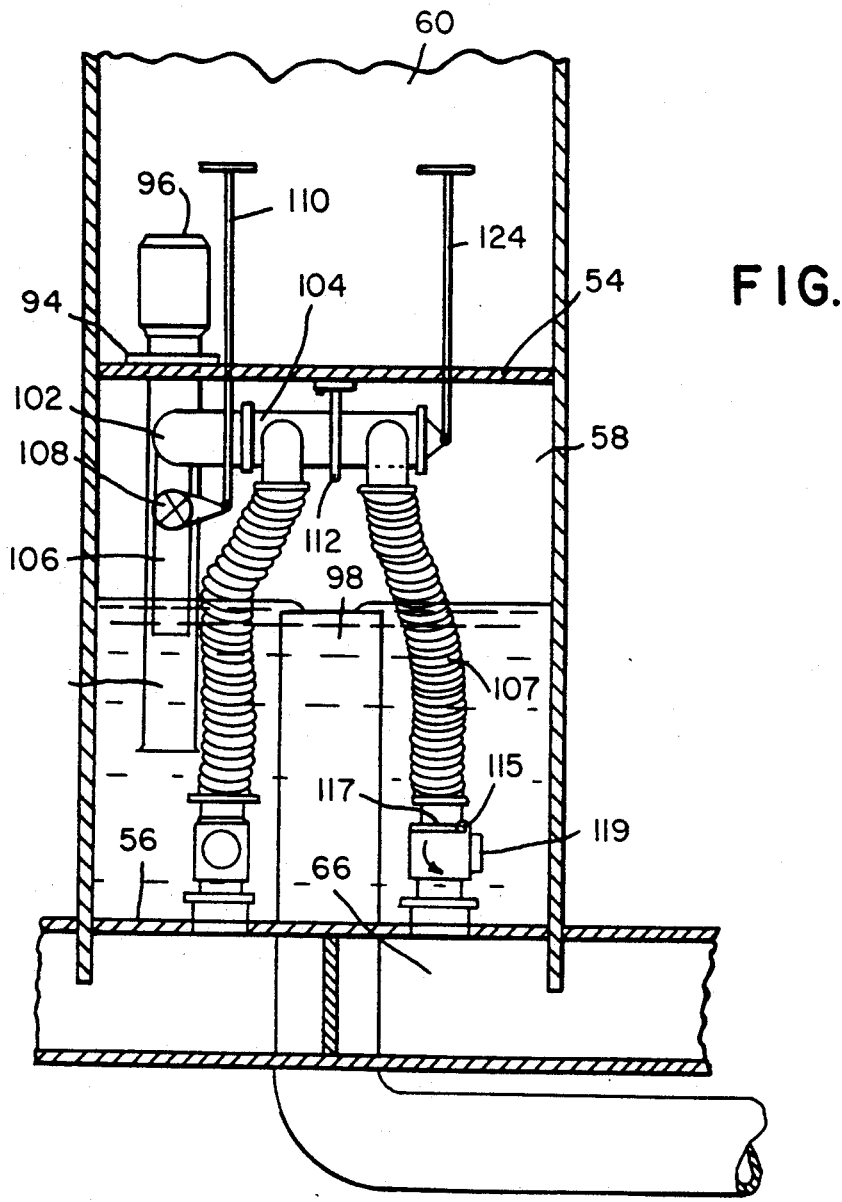
FIG. 7 is an enlarged, fragmentary vertical sectional view of the filtration system showing an alternative embodiment of the filter effluent chamber shown in FIG. 3, and which includes a pumped backwashing system.

If high-rate fluidized-bed backwashing is required such as, for example, when dual-media filter beds are used, there must be a relatively large positive head in control chamber 16 (at least 3 feet higher than the top of the washwater troughs in each filter cell). This can be accomplished by increasing the heigth of vertical pipe 72 above the filter washwater troughs or by using a unique pumped backwashing system, as shown in the alternative embodiment in FIGS. 7, 8 and 9. The main advantage of pumped backwashing is that deep filter boxes are not required so that even fluidized-bed backwashing can be accomplished in filter boxes that are shallower than the self-backwashing filter structure of the first embodiment.

Figure 8:
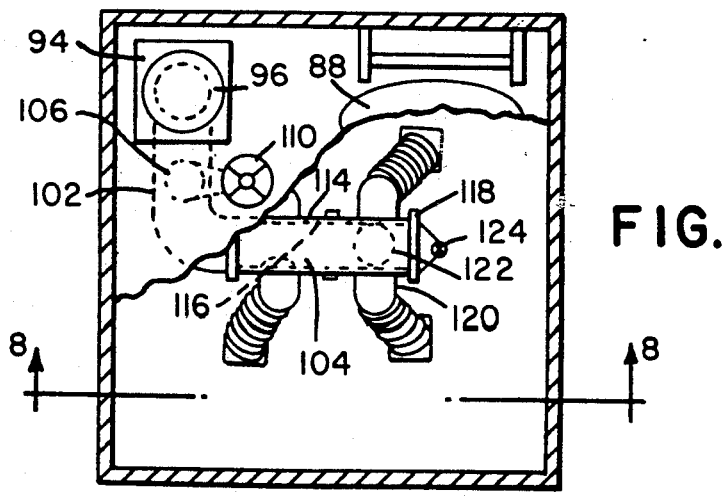
FIG. 8 is an enlarged plan view of the upper tier of the filter effluent chamber of FIG. 7 illustrating the placement of mechanical equipment.

As is best seen in FIG. 8, a small vertical turbine pump 94 is installed in one corner of upper tier 60. Only the pump motor 96 extends above intermediate floor 54, with the pump suction column 100 and discharge piping 102 and associated valves 104 and 108 located below the floor and accessible by means of manhole 88. The pump 94 serves to increase the available head for backwashing beyond that attainable by circular overflow weir 98 which preferably extends to an elevation slightly above filter bed 38 and does not need to be adjustable in the vertical direction. However, weir 98 should be maintained at an elevation that will produce a liquid depth in lower tier 58 that meets minimum submergence requirements for pump 94.

The pumped backwash system is designed to pump filtrate from lower tier 58 into any one of the filter cells 12 at a backwash rate and pressure that is sufficient to fluidize filter bed 38. During a typical backwashing operation, filtrate is initially pumped through suction column 100, discharge piping 102, bypass pipe 106 and recycled into lower tier 58. Bypass valve 108 is then slowly closed by means of extended operator 110, gradually diverting the incoming flow into distributor valve 104, which is supported underneath intermediate floor 56 by support bracket 112. The incoming flow is diverted by distributor valve 104 through one of four substantially vertically disposed flexible distributor pipes 107 which are fixedly attached at their top ends to distributor valve 104 and at their lower ends to check valves 15. The distributor pipes 107 convey the incoming flow directly into underdrain plenum 66 wherein the flow is directed to the filter cell to be backwashed.

As illustrated in FIG. 8, distributor valve 104 is of a novel construction, consisting of an elongated outer cylinder 114 and a concentrically diposed inner cylinder 116 which rotates freely about its axial extent and is confined and sealed at both ends by flanges 118. Outer cylinder 114 contains four down-turned outlet ports 120 which project outwardly from both sides of the cylinder in a common horizontal plane and bend 90 degrees in a downward direction. Inner cylinder 116 contains two circular openings 122 drilled through the cylinder walls along its axial extent and justaposed 90 degrees to one another. Openings 122 are approximately the same size as the internal openings of ports 120 and spaced apart so that they can be brought into alignment with ports 120 by rotating inner cylinder 116. Inner cylinder 116 can be rotated through 360 degrees by means of extended operator 124 so that, at any given operating position, only one of the two openings 122 will align with one of the four ports 120, while the other opening faces an interior wall portion of the inner cylinder. Consequently, the entire incoming backwash flow can be effectively diverted into any one of the four ports 120.

A closed conduit system as described above is necessary if a pumped backwashing system is used in order to divert flows to a filter cell under pressure. As a result, specially designed check valves 115 are required to allow filtrate to continue to flow into lower tier 58. Check valves 115 are fixedly attached to intermediate floor 56 above flow transfer ports 68. The spring-loaded swing plate 117 of check valve 115 is arranged so that it swings open during backwashing, allowing backwash flows into plenum 66 while sealing side outlet 119. During filtration, swing plate 117 swings closed allowing filtered water to flow freely through side outlet 119 and into lower tier 58.

Figure 9:
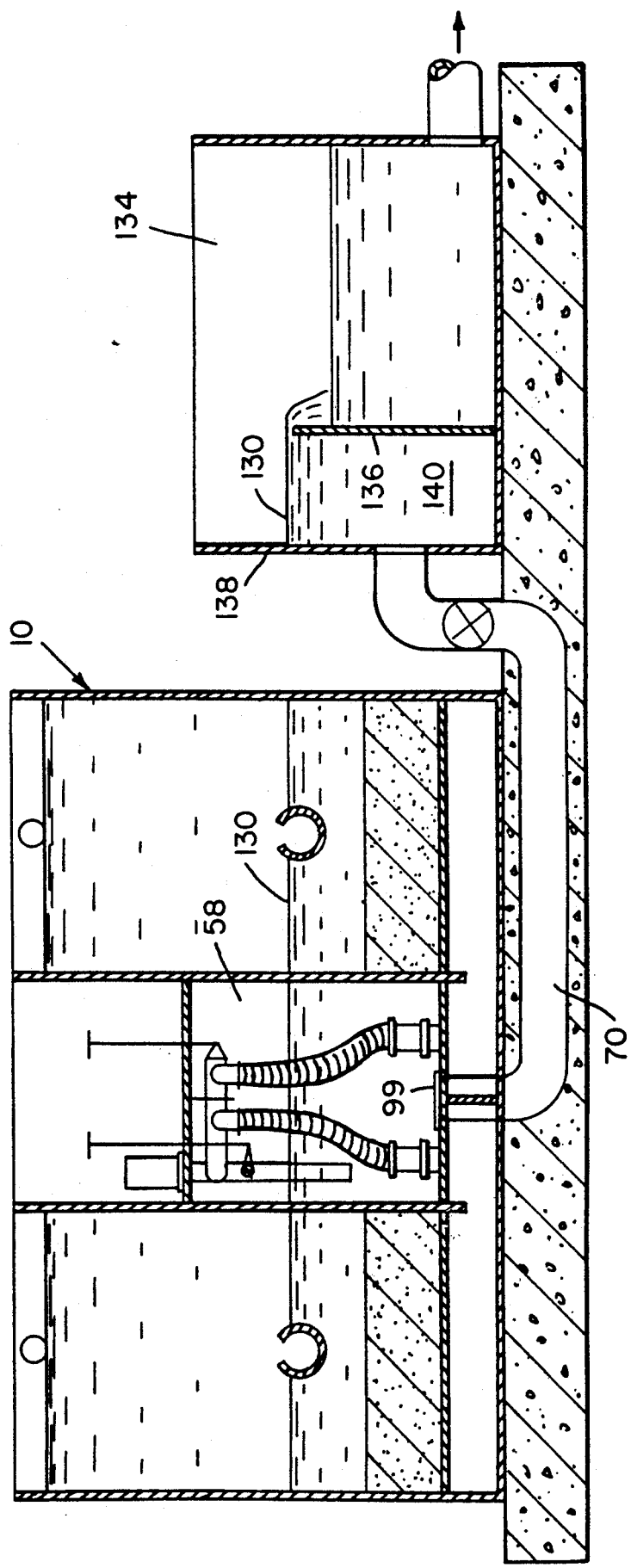
FIG. 9 is a vertical sectional view of the filtration system of FIG. 7 and a filtered water storage reservoir which communicates with the filtration system.

To provide fluidized-bed backwashing, a pumped backwash system should be capable of delivering 15 to 20 gallons per minute of washwater per square foot of filter surface area. Thus, if three out of four filter cells 12 of filter apparatus 10 are filtering at a combined rate of less than 15 gallons per minute per square foot when the remaining cell is removed from service for backwashing, then supplemental washwater flows must be provided. One convenient washwater source is the existing filtrate storage volume in lower tier 58 which can be drawn down over a fixed period to supplement the incoming filtered water. If this volume is not sufficient, lower tier 58 can be interconnected to a downstream storage reservoir 134 as depicted in FIG. 9. Lower tier 58 communicates with the storage reservoir 134 by means of filter outlet pipe 70. One end of outlet pipe 70 extends into lower tier 58 from below with pipe opening 99 protruding immediately above intermediate floor 56. The opposite end is connected to storage reservoir 134 and is equipped with valve 138 which serves to isolate filter apparatus 10 from reservoir 134. Reservoir 134 contains a vertically disposed overflow weir 136 which is spaced apart from endwall 138, forming a liquid storage volume 140, which can be used to supplement washwater flows during backwashing.

Although particular embodiments of the present invention have been illustrated and described, it will be apparent to those skilled in the act that various changes and modifications can be made without departing from the spirit of the present invention. It is therefore intended to encompass within the appended claims all such charges and modifications that fall within the scope of the present invention.

I claim:

1. A multiple filter, gravity flow, liquid filtering apparatus comprising:
   (a) plurality of adjacent independent filter chambers, each filter chamber including a filter bed of a filtering medium spaced above a bottom of the respective filter chamber, each said chamber having an opening above a respective filter bed to provide communication with the atmosphere, and a plenum underlying each filter chamber, said plenum communicating with each filter bed by a plurality of underdrain means;
   (b) influent supply means communicating with each filter chamber for permitting influent flow into each chamber, said supply means including flow control means for selectively controlling the rate of influent supply to each filter chamber;
   (c) drain means positioned within each filter chamber above a respective filter bed for collecting and conveying washwaters out of a respective filter chamber during a backwashing operation;
   (d) effluent control chamber means defined by substantially vertically disposed side walls having a height corresponding with a height of said filter chambers, said filter chambers surrounding said control chamber means, lower ends of said side walls terminating below the bottom of the filter chambers and above a bottom of said filtering apparatus to form a continuous, downwardly extending lip into said plenums;

(e) an intermediate floor within said control chamber means, said floor having a plurality of openings, each providing communication with a respective filter chamber and defining unrestricted liquid passages permitting bi-directional flow of filtrate between a respective plenum and said control chamber means in flow directions responsive solely to differences in liquid levels between said bed and said control chamber means, said openings being temporarily sealable by plugging means to isolate and drain a given filter chamber while other said filter chambers remain in operation; and (f) substantially vertically disposed conduit means within said control chamber means, said conduit means having an upper end open to the atmosphere to define a circular weir, said weir setting the operating liquid level in said control chamber means and permitting filtrate to be collected uniformly in said control chamber means, and a lower end of said conduit means extending below said filter chambers and outwardly beyond the filter apparatus, said conduit means serving to convey filtrate out of said filter apparatus for subsequent treatment or storage.

2. A multiple filter apparatus according to claim 1, wherein said influent supply means includes a distribution trough above and extending across at least one filter chamber, said trough having horizontal pipe conduit means for receiving influent flows and vertical pipe conduit means for substantially equally splitting and distributing influent flows to said filter chambers, said substantially vertical pipe conduit means including a plurality of vertically disposed pipe conduits with their respective top ends open to the atmosphere and serving as circular weirs, said weirs defining the operating liquid level in said trough, respective lower ends of each said vertical pipe conduit means penetrating downwardly through said trough and terminating at each of the said filter chambers, said vertical pipe conduit means each including valve means for discontinuing flow to a respective filter chamber.

3. A multiple filter apparatus according to claim 1, wherein said drain means includes at least one collection conduit spanning horizontally across one filter chamber and maintained at a fixed elevation above the filter bed, each said collection conduit having a continuous longitudinally extending slot opening upwardly along its top surface, said slot serving to collect rising washwater flows uniformly from said filter chamber, said washwater flows discharging freely into said collecting conduit and conveyed by gravity to a substantially vertical drain pipe positioned exteriorly of said filter apparatus, said vertical drain pipe having substantially the same diameter as said collection conduits at their respective upper ends and fixedly attached thereto, said drain pipes including valve means for controlling flow therethrough, said slotted opening and said collection conduit having a size sufficient to collect and freely convey washwater flows discharging into said collection conduit.

4. A multiple filter apparatus according to claim 1, wherein said substantially vertically disposed conduit means in said control chamber means includes an adjustable circular weir at its upper end with adjustment means for adjusting the elevation of said weir, thereby permitting the liquid level in said control chamber means to be raised or lowered relative to the liquid level in a given filter chamber in order to change the direction of flow and initiate filtering or backwashing operations in said filter chamber.

5. A multiple filter apparatus according to claim 1, including an upper intermediate floor above said vertically disposed conduit means in said control chamber means to define an upper section for supporting backwashing and air scour apparatus for cleaning said filter beds, said upper section including a recessed and sound attenuating enclosure within the dimensional confines of said multiple filter apparatus, 6. A multiple filter apparatus according to claim 5, wherein said backwashing and air scour apparatus in said upper section includes an air blower and a plurality of air distribution pipes, said air distribution pipes extending downwardly from said upper section to the bottom of said control chamber means and penetrating through the sidewalls of said control chamber means into the respective plenums of said filter chambers, said downwardly extending lip of said side walls allowing an air blanket to form within a given filter chamber plenum while effectively preventing air from escaping into the adjoining control chamber means during air scour operations, said air blanket imparting a back pressure on said underdrain means, thereby allowing air to be uniformly metered through said underdrain means during air scour operations.

7. A multiple filter apparatus according to claim 5, wherein said backwashing and air scour apparatus includes pumping means for pumping filtrate collected in the lower section of said control chamber means through closed conduit means into the respective plenums of said filter chambers for the purpose of backwashing said filter beds, said pumping means positioned in said upper section of said control chamber means with a pump suction column penetrating through said upper intermediate floor, said closed conduit means including a pump suction column, pump discharge header, recycle outlet pipe, throttling valve, flow distribution valve, a plurality of flexible pipe discharge laterals, and a plurality of bi-directional flow check valves, said pump suction column extending downwardly from said pumping means and vertically disposed in the lower section of said control chamber means with an open inlet end that is submerged below the normal operating liquid level in said control chamber means, said recycle outlet pipe communicating with and extending downwardly there from said pump discharge header and having an open outlet end that is submerged below the normal liquid operating level of said chamber and valve means for throttling flows through the recycle outlet pipe, said flow distribution valve attached to and communicating directly with said discharge header, to allow the entire liquid flow to be diverted to any given filter unit for backwashing purposes.

said flexible pipe discharge laterals attached to said flow distribution valve within said control chamber means and extending downwardly to said check valves, said valves completely sealing said openings of said lower intermediate floor so that filtrate flows can be pumped under pressure into the respective plenum of a given filter unit, said check valves comprising a substantially vertically disposed valve enclosure with inlet and outlet flanged ports at opposite ends and a side outlet port on one sidewall of said valve enclosure perpendicular to said inlet and outlet ports, swing-plate means included inside said check valves and oriented to allow flow in one direction through said inlet port and outlet port while sealing said side-port, and to allow flow in an opposite direction through said outlet port and side-port while sealing said inlet port.

8. A multiple filter apparatus according to claim 7, wherein said lower section of said control chamber means communicates with a storage reservoir spaced from said filter apparatus, said storage reservoir including upward extending weir means for controlling the liquid level in said lower tier of said control chamber and creating a fixed storage volume within said storage reservoir for backwashing purposes.

9. A multiple filter apparatus according to claim 1, wherein said vertically disposed conduit means terminates in at least one pipe lateral extending outwardly from the base of said conduit, said lateral running substantially horizontally and through at least one plenum of said filter chambers above the filter bottom and penetrating through an exterior side wall of said filter apparatus, said lateral serving to convey filtrate out of said filter apparatus for subsequent treatment or storage.

10. A method for backwashing a filter chamber with filtrate from an adjoining filter chamber, said method comprising the steps of:
   providing relatively adjoining filter chambers with a central control chamber that communicates with underdrain plenums of said filter chambers,
   providing an upwardly extending adjustable circular weir within said control chamber for collecting filtrate discharged from said filter chambers and for controlling the liquid level in said control chamber,
   closing an inlet to a given filter chamber and opening a drain outlet of said filter chamber, allowing the liquid level to drain until the liquid levels in said filter chamber and said control chamber are equalized and there is no net flow into or out of said filter chamber,
   admitting air of sufficient pressure and volume into the plenum of said filter chamber to scour the filter bed of said chamber and dislodge any impurities that have accumulated in said bed,
   upon completion of air scouring, raising said adjustable weir in said control chamber so that the liquid level in said chamber can rise higher than the liquid level in said filter chamber, thereby reversing the directing flow through said filter chamber to carry away dislodged impurities to a drain outlet,
   upon completion of backwashing, loW(ring said adjustable weir, closing said drain outlet and opening said filter inlet to resume filtering operations.

11. A method for backwashing a filter chamber with filtrate from an adjoining filter unit comprising the steps of:
   providing relatively adjoining filter chambers including filter beds and underdrain plenums and a central control chamber that communicates with the underdrain plenums of each of said filter chambers,
   providing pumping means and closed conduit means in said control chamber for pumping filtrate flows collected in said control chamber to a given filter chamber for backwashing purposes,
   providing a vertically disposed circular weir in said control chamber for collecting filtrate discharged from said filter chambers and for maintaining the liquid level in said control chamber at a constant depth,
   closing an inlet of a given filter chamber and opening a drain outlet of said filter chamber to allow the liquid level within the filter chamber to drop until the liquid levels in said filter chamber and said control chamber are equalized,
   activating the pumping means at a pumping rate so that filtrate in said control chamber is pumped under pressure through the closed conduit means, into the plenum of said filter chamber, and through the filter bed at a sufficient rate to fluidize said bed, thereby dislodging impurities in the bed and carrying the impurities away to a drain outlet, said pumping rate being controlled by a throttling valve on a recycle pipe of said closed conduit means, the diversion of filtrate into said filter chamber controlled by a flow distribution valve communicating with said closed conduit means.

* * * * *